March 11, 1930. A. C. NICKELL, JR 1,749,837
GEAR SHIFT
Filed April 27, 1928 2 Sheets-Sheet 1
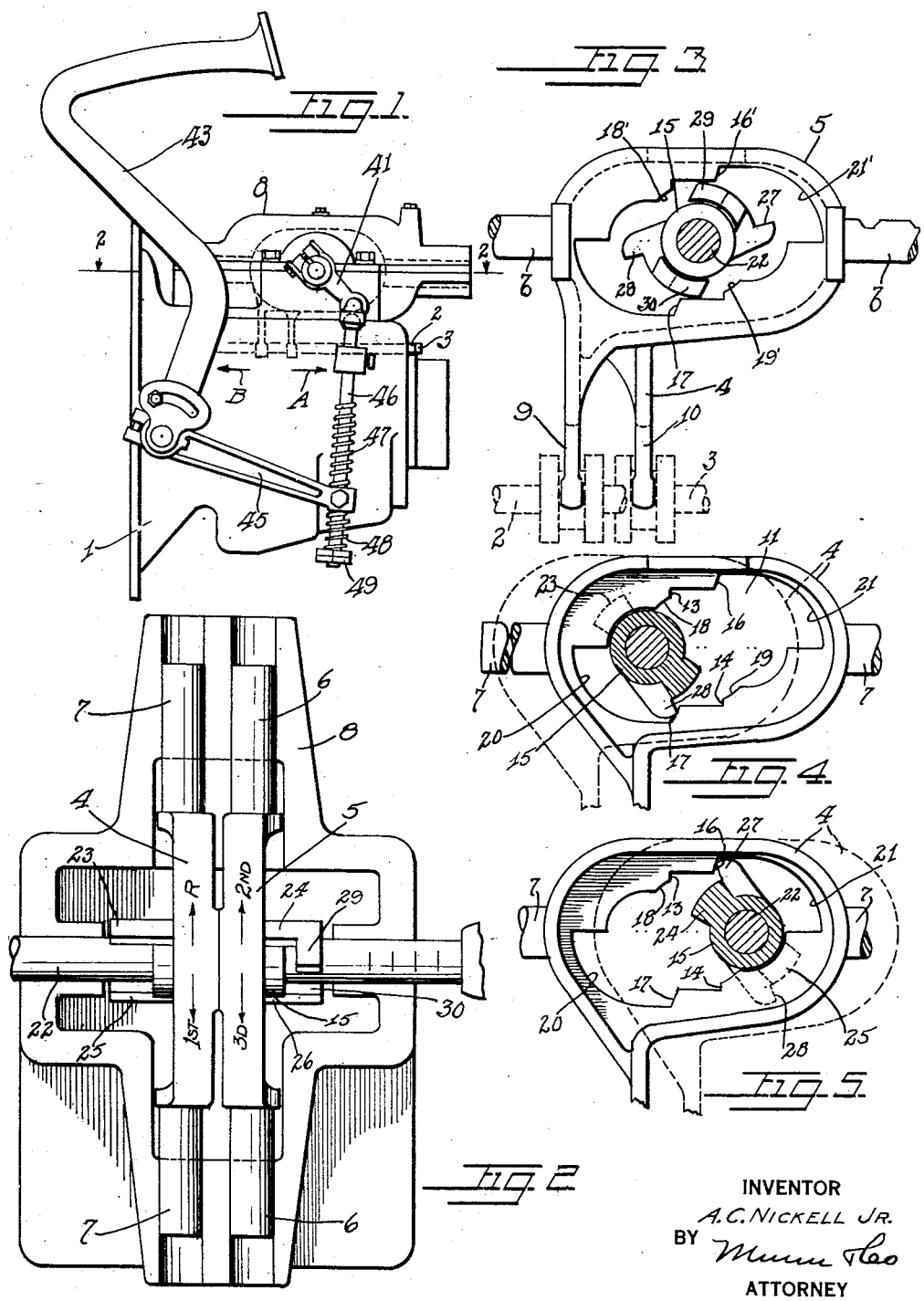
INVENTOR
A.C. NICKELL JR.
BY
ATTORNEY

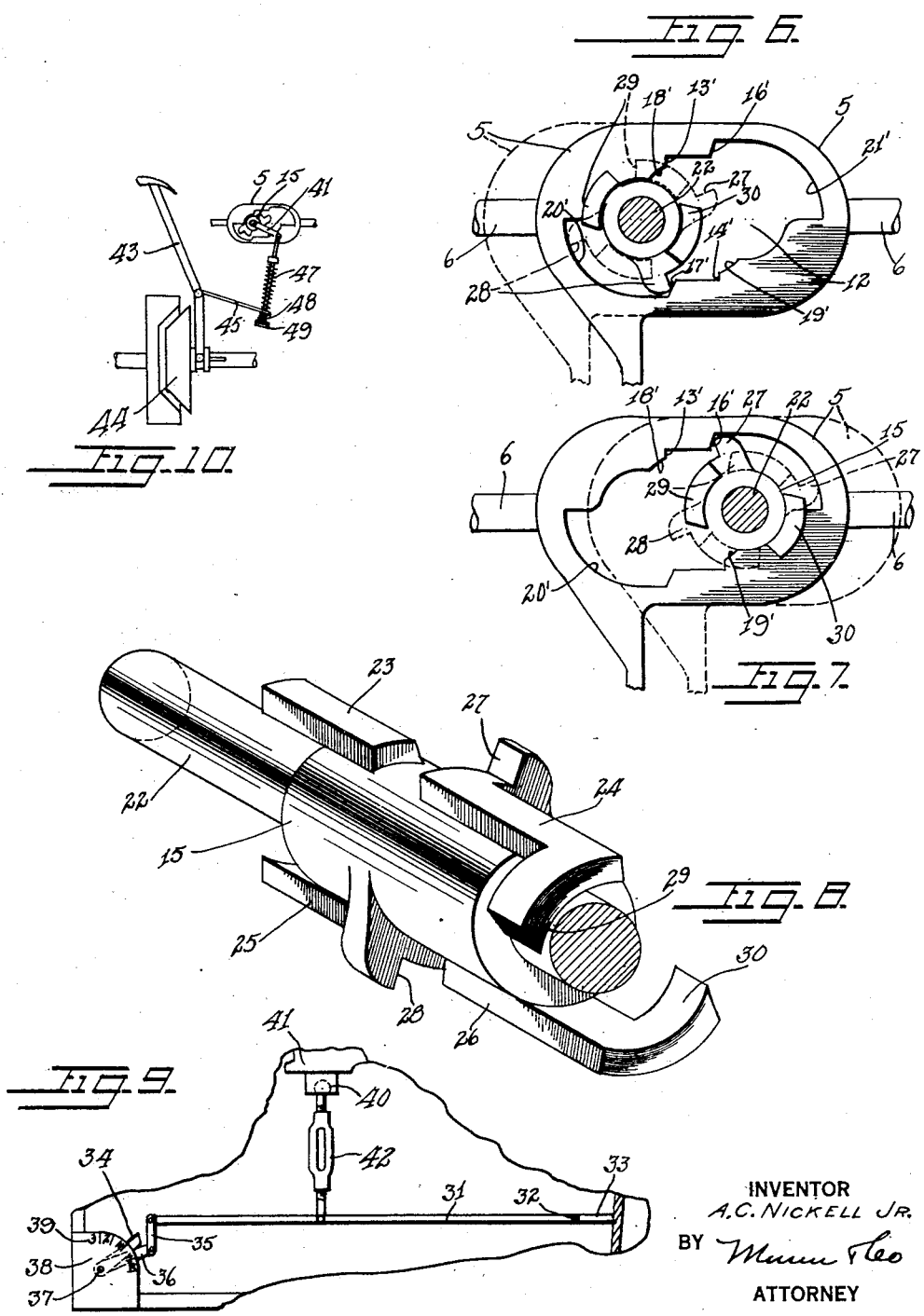

Patented Mar. 11, 1930

1,749,837

UNITED STATES PATENT OFFICE

ARTHUR CORNWALL NICKELL, JR., OF WAUKESHA, WISCONSIN

GEAR SHIFT

Application filed April 27, 1928. Serial No. 273,333.

My invention relates to improvements in gear shifts, and it consists in the combinations, constructions, and arrangements herein described and claimed.

An object of my invention is to provide an improvement over Patent No. 1,255,933, of February 12, 1918. In said patent, there is shown a clutch pedal that is adapted to be moved so as to release the clutch, this constituting the first action; the second action of the clutch pedal being to throw the gear shifting mechanism into neutral position; and the third action being to throw the gear shifting mechanism into a desired position, this last movement taking place only when the clutch pedal is fully depressed, whereupon a release of the clutch pedal will drive the car at the speed thus selected.

In the present form of the device, I show resilient means for causing the gears to be shifted from one speed to another, whereby the gears are adapted to be first aligned with each other before they are moved into engagement with each other, thus eliminating any chance of stripping the gears.

A further object of my invention is to provide a device of the type described which can be readily applied to a standard transmission mechanism without altering the construction of the latter, the device being provided with lugs which engage with the two gear shifting rods in the transmission casing, these lugs taking the place of the usual gear shifting lever.

A further object of my invention is to provide a device of the type described which has a novel means for preventing shifting of the gears from second or third speed positions into reverse speed position.

Other objects and advantages will appear in the following specification, and the novel features of the invention will be particularly pointed out in the appended claims.

My invention is illustrated in the accompanying drawings, forming part of this application, in which Figure 1 is a side elevation of the device and is shown operatively applied to a standard transmission mechanism, Figure 2 is a section substantially along the line 2—2 of Figure 1, Figures 3, 4, 5, 6 and 7 are views showing parts of the device when shifting the gears from neutral position into reverse, first, second and third speeds, Figure 8 is an isometric of the selective means for shifting the gears, Figure 9 is a plan view of a portion of the device, and Figure 10 is a diagrammatic view showing the device in a position to permit the shifting of the gear-changing mechanism and also showing the clutch in released position.

In carrying out my invention, I make use of a standard transmission mechanism 1 that employs the usual rods 2 and 3 for shifting the gears, not shown, within the transmission casing. The rods 2 and 3 function in the normal manner. For example, when the rod 2 is moved in the direction of the arrow A shown in Figure 1, the gears within the transmission casing will be shifted into reverse speed. In like manner, when the rod 2 is moved in the direction of the arrow B, it will move the gears into first speed. The rod 3 when moved in the direction of the arrow A will move the gears into second speed, and when moved in the direction of the arrow B will move the gears into third speed. It will be seen from the description thus far that the device operates in the same way as the standard transmission mechanism.

Instead however of a gear shifting lever being provided as is usually the case, I provide two gear shifting devices or slides 4 and 5 that are disposed parallel with each other and that are provided with aligned rods 6—6 and 7—7. These rods are slidably received in a casing 8.

In Figures 2 and 3, I have shown the slides 4 and 5 in neutral position. By viewing Figure 3, it will be noted that the slides 4 and 5 are identical in construction with the exception of the integral forked rod-moving members 9 and 10, respectively. The slides 4 and 5 are provided with openings 11 and 12 of a predetermined shape. The opening 11 of the slide 4 is provided with neutral selector contacting shoulders 13 and 14 and the opening 12 of the slide 5 is provided with neutral selector contacting shoulders 13' and 14'. These neutral contacting shoulders are adapted to be engaged by a selector or slide-moving member 15 in a manner hereinafter described.

Operative selector contacting shoulders 16 and 17 are provided in the opening 11 of the slide 4 and operative selector contacting shoulders 16' and 17' are provided in the opening 12 of the slide 5. The remainder of the openings 11 and 12 is shaped so as to permit the free movement of the member 15 therethrough, the portions 18, 19, 20 and 21 of the opening 11 and the portions 18', 19', 20' and 21' of the opening 12 being provided for this purpose.

The selector 15 is rigidly mounted upon a shaft 22 which is rotatably and slidably mounted within the casing 8. The selector is provided with neutral moving cams 23 and 24 which are diametrically opposed to neutral moving cams 25 and 26. Operative moving lugs 27 and 28 are integral with the selector 15 and are positioned out of alignment with the neutral cams 23, 24, 25 and 26. Arcuate-shaped guiding flanges 29 and 30 are integral with the outer ends of the neutral cams 24 and 26.

The means for moving the selector 15 into its neutral and various operative positions, see Figure 9, consists of a lever 31 which is pivotally mounted at 32 to a stationary support 33. The free end of the lever 31 is operatively connected to a hand lever 34 by a link 35 and a lever 36. The hand lever 34 is pivotally mounted at 37 to an indicating plate 38 which has notches or grooves 39 which are adapted to receive a portion of the hand lever 34. These notches represent the neutral position and the various operative positions. The lever 31 is adjustably secured to a ball and socket joint 40 which is carried by a lever 41 by means of a turnbuckle 42.

A clutch pedal 43 of the transmission 1 is operatively connected to the clutch 44 in the usual manner and is provided with an arm 45. The arm 45 is arranged to move with the clutch and is operatively connected to the shaft 22 by the lever 41 which is rigidly secured to the shaft and a rod 46. Coil springs 47 and 48 are positioned upon each side of the arm 45 and concentric with the rod 46 for forming a flexible connection therebetween. The tension of the springs may be varied by the movement of lock nuts 49.

From the foregoing description of the various parts of the device, the operation thereof may be readily understood. Let us assume that the slides 4 and 5 are in neutral position, that position shown in Figures 2 and 3, and that the operator wishes to shift from neutral to reverse speed. The operator first moves the hand lever 34 into registration with the notch representing reverse speed. During this movement of the hand lever, the shaft 22, together with the selector, is moved to bring the lug 28 into operative alignment with the shoulder 17 of the slide 4, see Figure 4. Then by actuating the clutch pedal 43, the clutch 44 is released, thus disengaging the motor from the transmission and the shaft 22 is rotated bringing the lug 28 into engagement with the shoulder 17. During this movement of the selector, the lug 28 forces the slide 4 from the dotted line position, shown in Figure 4, to the full line position. This movement of the slide moves the gears of the transmission into reverse speed relation.

The change from reverse speed to first speed is effected by depressing the clutch pedal 43. Movement of the clutch pedal will of course release the clutch. During the movement of the clutch pedal, the selector 15 is actuated, bringing the lug 27 into engagement with the shoulder 16. The movement of the selector 15 moves the slide 4 from the dotted line position, shown in Figure 5, to the full line position. During this movement of the slide 4, the gears are moved from reverse speed relation to first speed relation.

It will be understood that any time after the clutch pedal has been released to bring the clutch into engaging position, the operator may swing the hand lever 34 into any other position. Therefore, after the car has attained the required speed while in first speed position, the operator may swing the hand lever 34 into second speed position. It will be noted that the openings 11 and 12 of the slides 4 and 5 are designed so as to permit the selector 15 to be shifted from first speed into second speed position without in any way affecting the movement of the slides. In other words, the selector may be in second speed position while the car is still in first speed position. The change from first speed to second speed is effected by depressing the clutch pedal 43. Movement of the clutch pedal will release the clutch so as to permit the gears to be shifted from first speed to second speed. The first rotative movement of the selector 15 will cause the cam 25 to engage with the cam shoulder 14 and move the plate 4 into neutral position. When the slide 4 has reached this position, the cam 25 is allowed to move freely with respect to the slide 4, due to the arcuate-shaped portions 18 and 19. At this point however, the clutch pedal has moved approximately one-half the distance. During the remainder of the movement of the clutch pedal, the lug 28 engages with the shoulder 17' of the plate 5, see Figure 6, and moves the plate 5 from the dotted line position in Figure 5 to the solid line position. The clutch pedal is then released, allowing the clutch to engage. As the required speed is being attained for shifting the gears from second speed position to third speed position, the hand lever 34 may be moved into the third speed position, thus moving the selector into the position required for shifting the gears from second speed position to third speed position. By depressing the clutch pedal again, the cam 24 engages with the shoulder 13' of the slide 5 and during the first half of the movement of the clutch pedal, the slide 5 is moved so as to bring the gears from second speed position into neutral position. During the latter half of the movement of the clutch pedal, the lug 27 of the selector engages with the shoulder 16' and moves the slide 5 into third speed position. The first half of the movement of the clutch pedal and the second half of the movement of the clutch pedal is mentioned merely to define what happens during these two movements of the clutch pedal, but in reality there is but one continuous movement of the clutch pedal, during which two operations are performed.

The flanges 29 and 30 are provided for preventing the operator from shifting from second or third speed positions into reverse speed position. In Figure 6, I have shown in solid lines the slide 5 in second speed position and the selector in its finished position for moving the slide 5 into second speed position. The dotted line position of the selector indicates the position after the clutch pedal has been released. It will be noted that the flange 29 is positioned so that it will strike against the slide 5 should the operator try to move the selector into reverse speed position. Therefore, the flange 29 prevents the movement of the selector from second speed position into reverse speed position.

In a like manner, the flange 30, see Figure 7, when the selector is allowed to move into the dotted line position due to the releasing of the clutch pedal, will engage with the slide 5, thus preventing the moving of the selector into reverse speed position when the slide 5 is in third speed position.

The main objects of this invention are to provide means whereby the device may be actuated for shifting the gears from one operative position into neutral position and into another operative position during one continuous movement of the clutch pedal and to prevent the shifting of the gears from second or third speed positions into reverse speed position.

I claim:

1. In an automatic gear shifting mechanism, the combination with a shaft, of a selective device carried thereby, a clutch operating means including a clutch pedal for actuating the device, said device comprising two gear shifting slides, a selector, a cam carried by said selector for moving said slides into neutral positions, lugs carried by said selector for moving said slides into gear shifting positions, and flanges carried by said selector for positively holding said selector against movement of said slides into a reverse speed position when said slides have been moved into second or third speed positions.

2. In an automatic gear shifting mechanism, the combination with a shaft, a selective device carried thereby, a clutch operating means including a clutch pedal for actuating the device, said device comprising two gear shifting slides arranged to be moved from neutral positions into first, second, third, and reverse speed positions, a selector, means carried by said selector for moving said slides into any desired positions, and means carried by said selector for positively holding said selector against movement of said slides into a reverse speed position from second or third speed positions.

3. In an automatic gear shifting mechanism, the combination with a shaft, a selective device carried thereby, a clutch operating means including a clutch pedal for actuating the device, said device comprising two gear shifting slides arranged to be moved from neutral positions into first, second, third, and reverse speed positions, a selector, means carried by said selector for moving said slides into any desired positions, and means carried by said selector for positively holding said selector against movement of said slides into a reverse speed position from second or third speed positions, said means comprising flanges carried by said selector and arranged to engage with said slides.

ARTHUR CORNWALL NICKELL, JR.